US011353739B2

(12) United States Patent
Yoo et al.

(10) Patent No.: US 11,353,739 B2
(45) Date of Patent: Jun. 7, 2022

(54) REFLECTIVE DISPLAY DEVICE

(71) Applicant: SAMSUNG DISPLAY CO., LTD., Yongin-Si (KR)

(72) Inventors: Junwoo Yoo, Seongnam-si (KR); Donghyeon Lee, Seoul (KR); Sunhee Oh, Anyang-si (KR); Taeho Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 367 days.

(21) Appl. No.: 16/229,930

(22) Filed: Dec. 21, 2018

(65) Prior Publication Data

US 2019/0196267 A1    Jun. 27, 2019

(51) Int. Cl.
*G02F 1/1335* (2006.01)
*B82Y 20/00* (2011.01)
*B29D 11/00* (2006.01)

(52) U.S. Cl.
CPC .. *G02F 1/133553* (2013.01); *B29D 11/00326* (2013.01); *B82Y 20/00* (2013.01); *G02F 1/133514* (2013.01); *G02F 1/133528* (2013.01); *G02F 1/133502* (2013.01); *G02F 2201/38* (2013.01); *G02F 2202/28* (2013.01); *G02F 2202/30* (2013.01); *G02F 2202/36* (2013.01); *G02F 2203/02* (2013.01)

(58) Field of Classification Search
CPC ......... G02F 1/133555; G02F 1/133514; G02F 1/133528
See application file for complete search history.

(56) References Cited

U.S. PATENT DOCUMENTS

| 5,990,995 | A | * | 11/1999 | Ebihara | G02F 1/133553 349/113 |
|---|---|---|---|---|---|
| 6,543,901 | B2 | | 4/2003 | Moon | |
| 7,019,801 | B2 | | 3/2006 | Ueki et al. | |
| 8,902,380 | B2 | * | 12/2014 | Lu | G02B 5/1847 349/62 |
| 2003/0128319 | A1 | * | 7/2003 | Maeda | G02B 5/3016 349/115 |
| 2012/0169966 | A1 | | 7/2012 | Lu | |

(Continued)

FOREIGN PATENT DOCUMENTS

| KR | 10-2001-0029222 | 4/2001 |
|---|---|---|
| KR | 10-2001-0073239 | 8/2001 |
| KR | 10-2002-0037443 | 5/2002 |

OTHER PUBLICATIONS

Office Action dated Jan. 25, 2022 in corresponding Korean Patent Application 10-2017-0177862, in Korean (7 pages).

*Primary Examiner* — Lucy P Chien
(74) *Attorney, Agent, or Firm* — F. Chau & Associates, LLC

(57) ABSTRACT

A display device apparatus provides an increased color reproduction rate and/or contrast ratio. The display device includes a first substrate; a second substrate disposed on the first substrate; and a liquid crystal layer arranged between the first substrate and the second substrate. A reflective layer is disposed on the first substrate, a polarizing layer is disposed on one surface of the second substrate, and a metasurface pattern layer is disposed on the second substrate. The metasurface pattern layer includes a third substrate and a first metasurface pattern disposed on the third substrate.

26 Claims, 5 Drawing Sheets

(56) References Cited

U.S. PATENT DOCUMENTS

2012/0200817 A1 8/2012 Tweet et al.
2019/0129243 A1* 5/2019 Meyer Timmerman Thijssen ......
G02B 1/002

* cited by examiner

REFLECTIVE DISPLAY DEVICE

CROSS-REFERENCE TO RELATED APPLICATIONS

This application claims priority under 35 U.S.C. § 119 from Application No. 10-2017-0177862, filed on Dec. 22, 2017, in the Korean Intellectual Property Office (KIPO), the disclosure of which is incorporated by reference herein in its entirety.

TECHNICAL FIELD

Embodiments of the inventive concept relate to display device. More particularly, embodiments of the inventive concept are related to a reflective display device.

DISCUSSION OF RELATION ART

In recent years, display devices such as liquid crystal display ("LCD") devices or electrophoretic display devices are used in place of conventional cathode ray tubes (CRTs). The aforementioned display devices display images using a separate light source. In such a case, the display devices may be classified into transmissive display devices that display images using an embedded backlight as a light source, and reflective display devices that display images using external light as a light source without the use of a backlight.

The reflective display devices are largely used in applications where the external light, serving as a light source, is obliquely incident to a panel of the display device, by virtue of their characteristics. Accordingly, the reflective display devices may have a color reproduction rate or a contrast ratio that is lowered because if the obliquely incident light from the external source.

SUMMARY

Embodiments of the inventive concept may be directed to a reflective display device capable of increasing a color reproduction rate or a contrast ratio.

According to an embodiment the inventive concept, a display device includes: a first substrate; a second substrate disposed on the first substrate; a liquid crystal layer disposed between the first substrate and the second substrate; a reflective layer disposed on the first substrate; a polarizing layer disposed on one surface of the second substrate; and a metasurface pattern layer disposed on the second substrate. The metasurface pattern layer includes; a third substrate; and a first metasurface pattern on the third substrate. The metasurface negatively refracts light from an external source light obliquely incident to a display surface of the display device to be incident substantially perpendicular to a surface of the reflective layer.

The display device may further include a color filter disposed on one of the first substrate and the second substrate.

The polarizing layer may be disposed between the second substrate and the metasurface pattern layer.

The display device may further include an air layer or a transparent adhesive layer arranged between the polarizing layer and the metasurface pattern layer.

The first metasurface pattern may be disposed on one surface of the third substrate that faces the second substrate.

The first metasurface pattern may be disposed on one surface of the third substrate opposite to a surface of the third substrate facing the second substrate.

The first metasurface pattern may include a plurality of sub-wavelength antenna elements.

Each of the plurality of sub-wavelength antenna elements may have a size less than a wavelength of visible light.

Each of the plurality of sub-wavelength antenna elements may have a size ranging from about 20 nm to about 40 nm.

The plurality of sub-wavelength antenna elements may be spaced apart from each other by a distance ranging from about 3 nm to about κ nm.

Each of the plurality of sub-wavelength antenna elements may have at least one of a V-like shape, a rod shape, a polygonal plate shape, a ring shape, and a sphere shape.

The metasurface pattern layer may have a refractive index of about 5 or higher.

The display device may further include a second metasurface pattern disposed between the reflective layer and the liquid crystal layer.

The second metasurface pattern may be substantially the same as the first metasurface pattern.

The second metasurface pattern may be different from the first metasurface pattern.

The reflective layer may include a second metasurface pattern.

The display device may further include a light source on one side of the third substrate.

According to an embodiment of the inventive concept, a display device includes: a first substrate; a second substrate disposed on the first substrate; a liquid crystal layer disposed between the first substrate and the second substrate; a reflective layer disposed on the first substrate; a first metasurface pattern disposed on one surface of the second substrate; and a polarizing layer on another surface of the second substrate.

The display device may further include a color filter disposed on one of the first substrate and the second substrate.

The first metasurface pattern may include a plurality of sub-wavelength antenna elements.

Each of the plurality of sub-wavelength antenna elements may have a size ranging from about 20 nm to about 40 nm.

The plurality of sub-wavelength antenna elements may be spaced apart from each other by a distance ranging from about 3 nm to about 5 nm.

Each of the plurality of sub-wavelength antenna elements may have at least one of a V-like shape, a rod shape, a polygonal plate shape, a ring shape, and a sphere shape.

The display device may further include a second metasurface pattern disposed between the reflective layer and the liquid crystal layer.

In an embodiment of the inventive concept, the first metasurface pattern negatively refracts the obliquely incident light with respect to a normal line to the metasurface pattern to within about 10 degrees with respect of the normal line to pass through the color filter substantially perpendicularly.

The foregoing description is illustrative only and is not intended to be in any way limiting to the appended claims.

BRIEF DESCRIPTION OF THE DRAWINGS

A more complete appreciation of the inventive concept will be better-appreciated by a person of ordinary skill in the art by describing in detail exemplary embodiments thereof with reference to the accompanying drawings, wherein:

FIGS. 2 to 5 are cross-sectional views illustrating a display device according to embodiments of the inventive concept, in which:

FIG. 2 shows a polarizing layer disposed on an outer surface of a second substrate;

FIG. 3 shows a metasurface pattern 320 disposed on a surface of a third substrate;

FIG. 4 shows a second metasurface pattern disposed on a reflective layer; and

FIG. 5 shows the components of an upper panel disposed on the inner surface of the second substrate according to an embodiment of the inventive concept;

DETAILED DESCRIPTION

Figure 1:
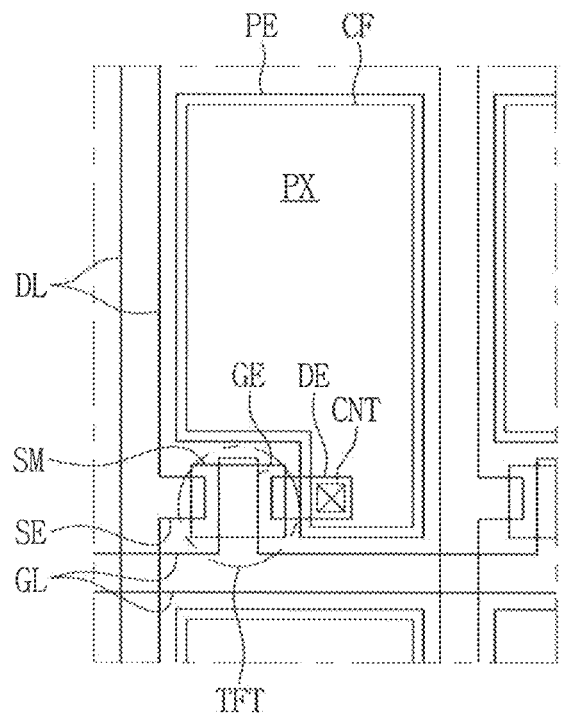
FIG. 1 illustrates pixels of a display device according to an embodiment of the inventive concept.

Exemplary embodiments of the inventive concept will now be described more fully hereinafter with reference to the accompanying drawings. Although the inventive concept may be modified in various manners and have several exemplary embodiments, exemplary embodiments are illustrated in the accompanying drawings and will be mainly described in the specification. However, the scope of the inventive concept is not limited to the exemplary embodiments and should be construed as including all the changes, equivalents and substitutions included in the spirit and scope of the inventive concept.

In the drawings, thicknesses of a plurality of layers and areas may be illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Further, when a layer, area, or plate is referred to as being "below" another layer, area, or plate, it may be directly below the other layer, area, or plate, or intervening layers, areas, or plates may be present therebetween. The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in another direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be understood by a person of ordinary skill in the art that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within 30%, 20%, 10%, 5%, 3% of the stated value.

Like reference numerals may refer to like elements throughout the specification.

First, a display device according to an embodiment of the inventive concept will be described with reference to FIGS. 1 and 2. In the present embodiment of the inventive concept, a reflective liquid crystal display ("LCD") device will be described by way of example. Further, unless stated otherwise, display devices according to all other embodiments of the inventive concept described below are assumed to be reflective LCD devices. However, the embodiments of the inventive concept are applicable to other types of reflective display devices.

FIG. 1 illustrates pixels of a display device according to an embodiment of the inventive concept.

Referring to FIG. 1, a display device includes a plurality of gate lines GL and a plurality of data lines DL. The plurality of data lines DL cross the plurality of gate lines GL. The plurality of gate lines GL extend to a non-display area NDA to be connected to a gate driver, and the plurality of data lines DL extend to the non-display area NDA to be connected to a data driver.

Pixels (e.g., see "PX" in FIG. 1) are located at a display area DA of the display device. A plurality of pixels located adjacent to each other may form one unit pixel. For example, adjacent pixels that are connected to a same gate line may form one unit pixel.

Adjacent pixels may be connected to different data lines. For example, one pixel may be connected to an odd-numbered data line, and another pixel adjacent to the one pixel may be connected to an even-numbered data line.

Pixels disposed along a horizontal line (hereinafter, "horizontal line pixels") are connected to the data lines DL, respectively. In addition, the horizontal line pixels are connected in common to the gate line GL. Accordingly, the horizontal line pixels receive the gate signal in common. For example, the pixels located on a same horizontal line all receive the same gate signal, but pixels located on different horizontal lines receive different gate signals from each other.

One pixel PX includes a thin film transistor ("TFT"), a liquid crystal capacitor, and a storage capacitor.

As shown in FIG. 1 in an enlarged view within the circle, the TFT includes a gate electrode GE, a source electrode SE, a drain electrode DE, and a semiconductor SM. The TFT is turned on according to the gate signal applied from the gate line GL. When the TFT is turned-on, an analog image data signal provided from the data line DL is applied to the liquid crystal capacitor and the storage capacitor.

The liquid crystal capacitor includes a pixel electrode PE and a common electrode opposing each other.

Figure 2:
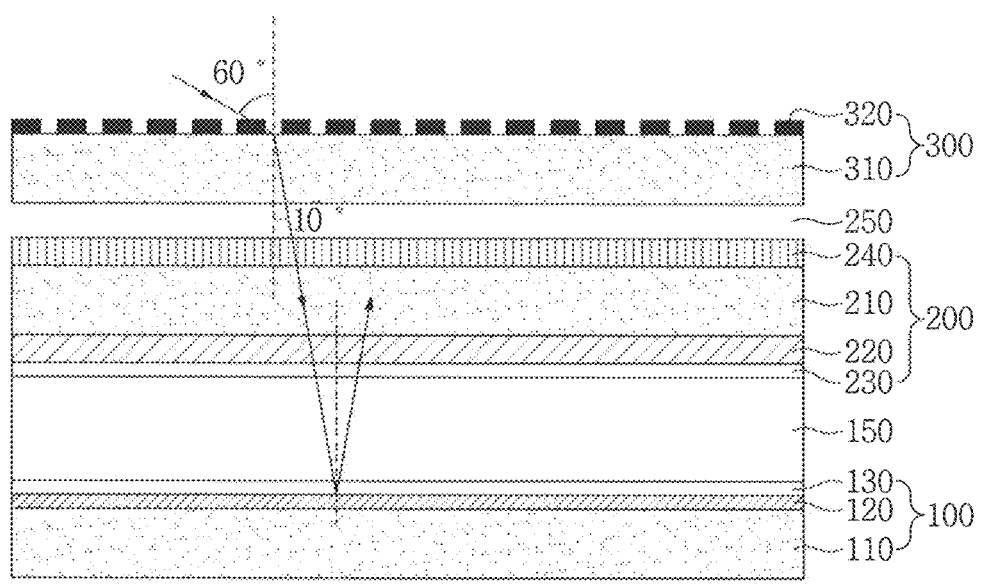
Figure 3:
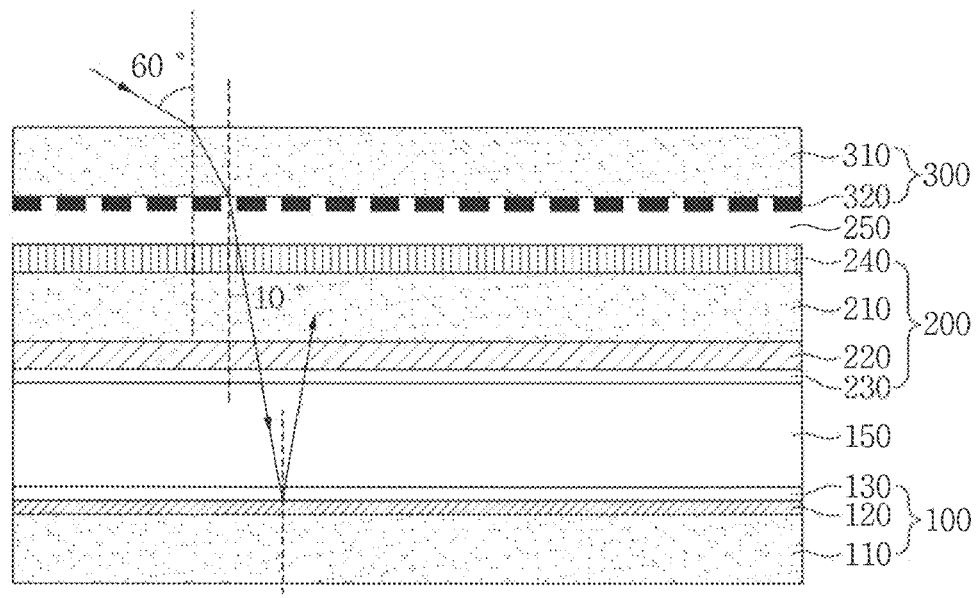

FIGS. 2 and 3 are cross-sectional views illustrating display devices according to embodiments of the inventive concept. More specifically, FIGS. 2 and 3 are cross-sectional views illustrating a pixel area which external light is incident to and reflected from.

Referring to FIG. 2, the display device includes a lower panel 100, a liquid crystal layer 150, an upper panel 200, and a metasurface pattern layer 300. The metasurface pattern arrangements layer 300 of the various embodiments of the inventive concept have a surface configured to negatively refract an external light that is obliquely incident on the display surface to an angle of incidence that is more perpendicular prior to striking a reflective layer.

The lower panel 100 may include, for example, a first substrate 110, a reflective layer 120 disposed on the first substrate 110 and a pixel electrode 130 disposed on the reflective layer 120. Although not illustrated in FIG. 2, for ease of description, the lower panel 100 may include a gate line GL, a gate insulating layer, a data line DL, a TFT, a protective layer, or the like.

In an embodiment of the inventive concept, the first substrate 110 may, be constructed of an insulating substrate including transparent glass, such as soda lime glass or borosilicate glass.

Alternatively, the first substrate 110 may include a flexible material. An example of the flexible material may include a plastic material. For example, the first substrate 110 may include one of: kapton, polyethersulphone (PES), polycarbonate (PC), polyimide (PI), polyethyleneterephthalate (PET), polyethylene naphthalate (PEN), polyacrylate (PAR), fiber reinforced plastic (FRP), or the like.

According to an embodiment of the inventive concept, the plurality of gate lines GL are disposed on the first substrate 110, and the gate insulating layer is disposed on the gate line GL. The data line DL is disposed in a direction crossing the gate line GL, for example, in a longitudinal direction. The gate line DL and the data line DL are connected to the TFT in an embodiment, a first protective layer may be disposed on the TFT, the data line DL, and the gate insulating layer. The first protective layer covers the TFT, the data line DL, and the gate insulating layer so as to substantially prevent them from becoming detached, and insulate them from another conductive material disposed on the protective layer.

The reflective layer 120 may be disposed on the first substrate 110, or may be disposed on the above-described first protective layer. The reflective layer 120 may cover part of, or an entire surface of, the first substrate 110. For example, the reflective layer 120 may have a planar shape. The reflective layer 120 reflects an external light incident to the display device to enhance visibility. In another embodiment of the inventive concept, the reflective layer 120 may be disposed on an outer surface of the first substrate 110, e.g., on a surface of the first substrate 110 opposite to an inner surface of the first substrate 110 that faces a second substrate 210.

In an embodiment of the inventive concept, the reflective layer 120 may include or be formed of an alloy including silver (Ag), magnesium (Mg), aluminum (Al), platinum (Pt), palladium (Pd), gold (Au), nickel (Ni), and/or iridium (Ir).

In an embodiment of the inventive concept, the reflective layer 120 may include a first reflective layer including or being formed of an alloy including silver (Ag), magnesium (Mg), aluminum (Al), platinum (Pt), palladium (Pd), gold (Au), nickel (Ni), and/or iridium (Ir), and a second reflective layer including or being formed of a transparent conductive material, e.g., indium-tin-oxide (ITO), indium-zinc-oxide (IZO), and/or zinc oxide (ZnO).

In an embodiment of the inventive concept, a second protective layer may be disposed on the reflective layer 120. The second protective layer may have a single layer or multi-layer structure including an organic material, such as silicon oxide, silicon nitride, or a photosensitive organic material, or a low dielectric constant insulating material such as a-Si:C:O or a-Si:O:F. The second protective layer covers the reflective layer 120 to substantially prevent the reflective layer 120 from becoming detached, and insulate the reflective layer 120 from another conductive material disposed on the second protective layer.

With continued reference to FIG. 2, the pixel electrode 130 (the pixel electrode PE of FIG. 1) is disposed on the reflective layer 120. The reflective layer 120 is disposed on the first substrate 110 below the pixel electrode 130 to overlap the pixel electrode 130. In an embodiment, the pixel electrode 130 may be disposed on the second protective layer and may be spatially separated from a reflective electrode. The pixel electrode 130 may have various forms, including a planar shape or a linear shape. In addition, the plurality of pixel electrodes 130 are spaced apart from each other on the reflective layer 120.

In an embodiment of the inventive concept, the pixel electrode PE may be formed as a transmissive electrode, a transflective electrode, and; or a reflective electrode.

Transparent conductive oxide ("TCO") may be used to form a transmissive electrode. Such TCO may include at least one of indium tin oxide (ITO), indium zinc oxide (IZO), zinc oxide (ZnO), and/or indium oxide ($In_2O_3$).

A metal, e.g., magnesium (Mg), silver (Ag), gold (Au), calcium (Ca), lithium (Li), chromium (Cr), aluminum (Al) and copper (Cu), or an alloy thereof; may be used to form a transflective electrode and a reflective electrode. In such an exemplary embodiment, the electrode may be a transflective type or a reflective type depending on the thickness of the electrode. For example, the transflective electrode has a thickness of about 200 nm or less, whereas the reflective electrode has a thickness of about 300 nm or more. As the thickness of the transflective electrode decreases, the light transmittance and the resistance will increase. On the contrary, as the thickness of the transflective electrode increases, the light transmittance decreases, and the resistance may also decrease.

In addition, the transflective electrode and the reflective electrode may have a multilayer structure which includes a metal layer including a metal or a metal alloy and a TCO layer stacked on the metal layer.

In an embodiment of the inventive concept, the reflective layer 120 and the pixel electrode 130 may be formed unitarily. For example, the pixel electrode 130 may be formed as a reflective electrode to reflect external light, thus serving as both the reflective electrode and the reflective layer 120. In such an exemplary embodiment of the inventive concept, the separate reflective layer 120 may be omitted.

With reference to FIGS. 2-5, the upper panel 200 is disposed to face the lower panel 100. In addition, the upper panel 200 may include a second substrate 210, a color filter 220 (the color filter CF of FIG. 1), a common electrode 230, and a polarizing layer 240.

The second substrate 210 is disposed to oppose the first substrate 110. The second substrate 210 may include a material that is substantially the same as or different from a material included in the first substrate 110.

The common electrode 230 may be disposed on the second substrate 210. In addition, the common electrode 230 may be disposed to overlap the pixel electrode 130. The liquid crystal layer 150 may be arranged with the pixel electrode 130 and the common electrode 230 on opposite sides. In an embodiment of the inventive concept, the common electrode 230 has a planar shape, and is formed as a transmissive electrode which is described above in relation to the pixel electrode 130. However, a person of ordinary skill in the art should understand and appreciate that the common electrode 230 is not limited to the aforementioned shape and configuration.

The common electrode 230, along with the pixel electrode 130, applies an electric field over the liquid crystal layer 150. Accordingly, an electric field is formed in the liquid crystal layer 150 arranged between the common electrode 230 and the pixel electrode 130. In an embodiment of the inventive concept, the common electrode 230 may be disposed on a substrate, e.g., the first substrate 110, on which the pixel electrode 130 is disposed.

The liquid crystal layer 150 includes liquid crystal molecules, and the liquid crystal molecules may be liquid crystal molecules that have a negative dielectric constant and are aligned vertically.

Referring to FIG. 2, the color filter 220 is disposed between the second substrate 210 and the common electrode 230. In an embodiment, a capping layer may be disposed between the color filter 220 and the common electrode 230 to protect the color filter 220.

In another embodiment of the inventive concept, the color filter 220 may be disposed on the first substrate 110, for example, between the reflective layer 120 and the liquid crystal layer 150.

Referring to FIG. 2, the polarizing layer 240 is disposed on an outer surface of the second substrate 210 (a surface of the second substrate 210 opposite to an inner surface of the second substrate 210 facing the first substrate). The polarizing layer 240 transmits only specific light in a selective manner. In an embodiment of the inventive concept, the polarizing layer 240 may be disposed on the inner surface of the second substrate 210 that faces the first substrate. In an embodiment of the inventive concept, a retardation layer may be positioned between the second substrate 210 and the polarizing layer 240. The retardation layer may be formed as a quarter wave plate ("a λ/4 plate") that converts a linearly polarized light into a circularly polarized light. In an embodiment of the inventive concept, the retardation layer may be formed unitarily with the polarizing layer 240.

Referring to FIG. 2, the metasurface pattern layer 300 is disposed on the upper panel 200. The metasurface pattern layer 300 includes a third substrate 310 and a metasurface pattern 320 disposed on one surface of the third substrate 310. The metasurface pattern 320 is configured to refract the external light obliquely incident on the display panel to a more perpendicular angle prior to striking the reflective layer to illuminate the images shown by the reflective display device.

The third substrate 310 may include or be formed of a material substantially the same as a material included in the first substrate 110 or the second substrate 210. Alternatively, the third substrate 310 may include, or be formed of, a material different from a material included in the first substrate 110 and the second substrate 210. For example, the third substrate 310 may be formed of a glass substrate, or a dielectric film such as silicon.

In an embodiment of the inventive concept, there may be a gap 250 between the upper panel 200 and the metasurface pattern layer 300, e.g., between the polarizing layer 240 and the third substrate 310. The gap 250 may be filled with air or a transparent adhesive material. A sealing member (not illustrated) for maintaining and sealing the gap 250 may be disposed at an edge of the upper panel 200.

The metasurface pattern 320 refers to a pattern of a metamaterial in a two-dimensional shape. For example, the metasurface pattern 320 has a two-dimensional pattern including subwavelength-sized elements, e.g., antennas (or resonators). The metamaterial refers to a group of materials that exist in nature and artificially processed. The metamaterial reacts to external waves to show, for example, a negative refractive index, anomalous refractions, and a high refractive index.

In an embodiment of the inventive concept, in an application in the near-infrared and visible light ranges, each of the antennas of the metasurface pattern 320 has a nanometer (nm) size that is less than the wavelengths of the near-infrared and visible light. In addition, a phase and an amplitude of a new wave on a wavefront may be locally adjusted, depending on the structure and size of the antennas of the metasurface pattern 320. Accordingly, a path in which the wave is refracted or reflected may be adjusted as desired.

In regard to this, the generalized Snell's law is as follows:

$$\sin(\theta_t)n_t - \sin(\theta_i)n_i = \frac{\lambda_o}{2\pi}\frac{d\Phi}{dx} \quad \text{[Equation 1]}$$

wherein $n_i$ is a refractive index of a first medium, $n_t$ is a refractive index of a second medium, $\theta_i$ is an incidence angle of a light in the first medium, $\theta_t$ is a refraction angle in the second medium, $d\Phi/dx$ is a phase gradient, and $\lambda 0$ is a wavelength of a light.

In regard to the generalized Snell's law, see *Light Propagation with Phase Discontinuities: Generalized Laws of Reflection and Refraction*, by Nanfang Yu et al. (Science. 2011 Oct. 21; 334 (6054): 333-7. doi: 10.1126/science.1210713), which is incorporated by reference as background material, the refraction and reflection caused by the phase shift of light on the metasurface are referred to as 'anomalous refractions' and 'anomalous reflections', respectively.

Figure 6:
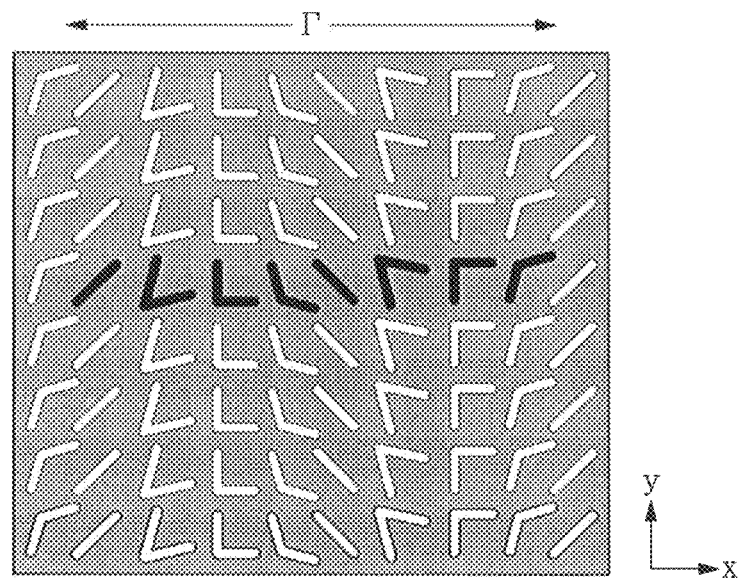
FIG. 6 illustrates an exemplary embodiment of a conventional metasurface pattern.
Figure 7:
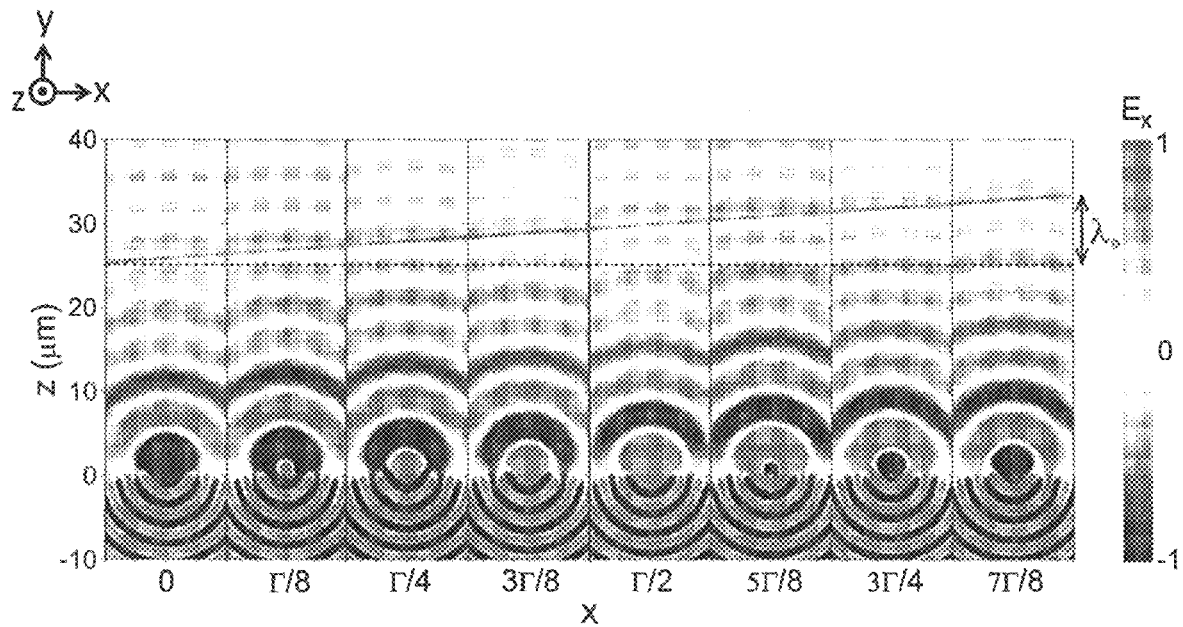
FIG. 7 illustrates a phase shift due to the conventional metasurface pattern.

FIG. 6 illustrates a conventional metasurface pattern, and FIG. 7 illustrates a phase shift due to the conventional metasurface pattern.

As illustrated in FIG. 6, the metasurface pattern 320 includes a unit cell including eight gold antennas having a width of about 220 nm and a thickness of about 50 nm. The unit cells are repeated with a pitch of about Γ=11 μm in an x-axis direction and about 1.5 μm in a y-axis direction.

As illustrated in FIG. 7, the antennas are formed to have a constant phase difference with neighboring antennas. Accordingly, each spherical wave is superimposed according to the principle of Huygens, resulting in an anomalously refracted plane wave, and this plane wave satisfies the generalized Snell's law (Equation 1) having a phase gradient of $|d\Phi/dx|=2\pi/\Gamma$.

In an embodiment of the inventive concept, the metasurface pattern 320 may include or be formed of a metal, such as gold or silver, dielectrics, graphene, or the like. As for the metamaterials, see *Low-Loss Plasmonic Metamaterials* by Boltasseva et al. (Science 331, 290 (2011); DOI: 10.1126/science. 1198258), which is incorporated by reference as background material for a description of such metamaterials. In addition, as described above, the metasurface pattern 320 may include nanometer-sized metamaterials, e.g., antenna elements, which may be manufactured using electron beam lithography or focused ion beam milling. In addition, the metasurface pattern 320 may be formed as a positive pattern or a negative pattern.

Figure 8A:
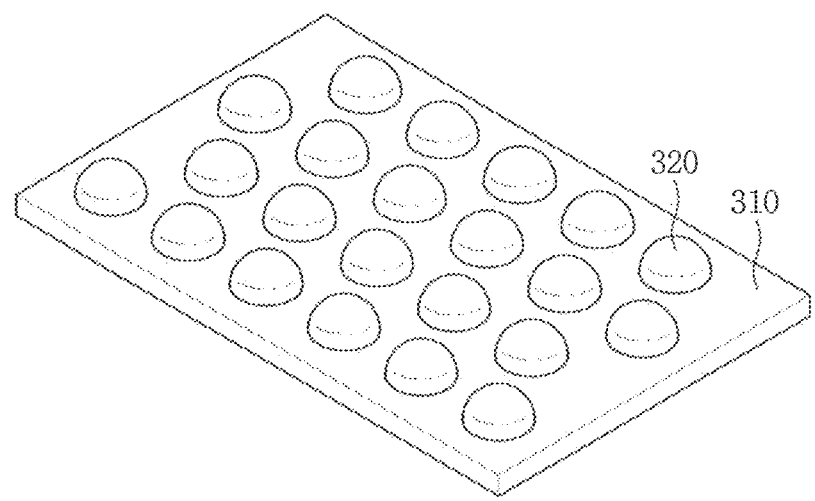
FIG. 8A is a perspective view illustrating a metasurface pattern layer according to an embodiment of the inventive concept.
Figure 8B:
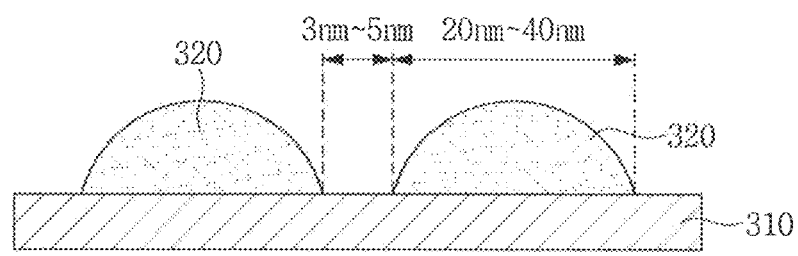
FIG. 8B is a cross-sectional view enlarging the metasurface pattern layer.

FIG. 8A is a perspective view illustrating a metasurface pattern layer according to an embodiment of the inventive concept, and FIG. 8B is a cross-sectional view enlarging the metasurface pattern layer.

As illustrated in FIGS. 8A and 8B, the metasurface pattern 320 is disposed on one surface of the third substrate 310. The metasurface pattern 320 includes a plurality of convex spherical nanoparticles 320, and the nanoparticles 320 are arranged to have a certain pattern. For examples, the nanoparticles 320 serve as the antenna element 320 described above. In an embodiment of the inventive concept, each of the nanoparticles has a size ranging from about 20 nm to about 40 nm. In addition, each of the nanoparticles is spaced apart from the neighboring particles by a distance ranging from about 3 nm to about 5 nm. The nanoparticles may include or be formed of gold, silver, or the like.

In an embodiment of the inventive concept, the nanoparticles 320 may have a substantially equal size and a substantially same shape as each other. Alternatively, the nanoparticles 320 may have different sizes and/or different shapes. For example, each of the nanoparticles 320 may have a substantially same shape but have different sizes, each of the nanoparticles 320 may have a substantially equal size but have different shapes, or each of the nanoparticles 320 may have different shapes and different sizes. For example, each of the nanoparticles 320 or the antenna elements 320 may have, for example, a V-like shape, a rod shape, a polygonal plate shape (e.g., a quadrangular plate shape), a ring shape, or a sphere shape.

In an embodiment of the inventive concept, the metasurface pattern layer 300 is formed to have a refractive index that is higher than a refractive index of a typical substrate (e.g., 1.5). For example, the metasurface pattern layer 300 may have a refractive index of about 5 or higher.

As illustrated in FIG. 2, a light incident to the metasurface pattern layer 300 at an oblique angle (e.g., at an angle of about 60 degrees with respect to a normal line to the metasurface pattern layer 300) is sharply refracted as passing through the metasurface pattern 320 (e.g., anomalously refracted at an angle of about 10 degrees with respect to the normal line of the metasurface pattern layer 300) to pass through the color filter 220 substantially perpendicularly. In addition, a light reflected from the reflective layer 120 passes through the color filter 220 again at a substantially perpendicular angle with respect to the normal line. A distance between two points of the color filter 220 on a path through which the light passes is also reduced. Accordingly, in an embodiment of the inventive concept, an amount of light that passes through the color filter 220 to be emitted outwards may increase, and an amount of the mixture of lights that pass through color filters 220 that are adjacent to each other and have different colors from each other may be reduced. Accordingly, a color reproduction rate and a contrast ratio of the display device may be enhanced.

In an embodiment of the inventive concept, the display device may include an artificial light source, e.g., a light emitting diode ("LED"), on an edge portion of the upper panel 200. In an embodiment, the metasurface pattern 320 may be formed so that a light incident from the artificial light source to the metasurface pattern 320 at an oblique angle may be refracted substantially perpendicularly.

Referring again to FIG. 2, the metasurface pattern 320 is disposed on one surface of the third substrate 310, e.g., on an outer surface of the third substrate 310 opposite to an inner surface of the third substrate 310 toward the second substrate. However, the exemplary embodiments are not limited to the aforementioned. As illustrated in FIG. 3, the metasurface pattern 320 may be disposed on another surface of the third substrate 310, e.g., the inner surface of the third substrate 310 facing the second substrate. As described above, there may be a gap between the metasurface pattern 320 and the second substrate 210, and the gap may be filled with an air layer or a transparent adhesive layer.

Figure 4:
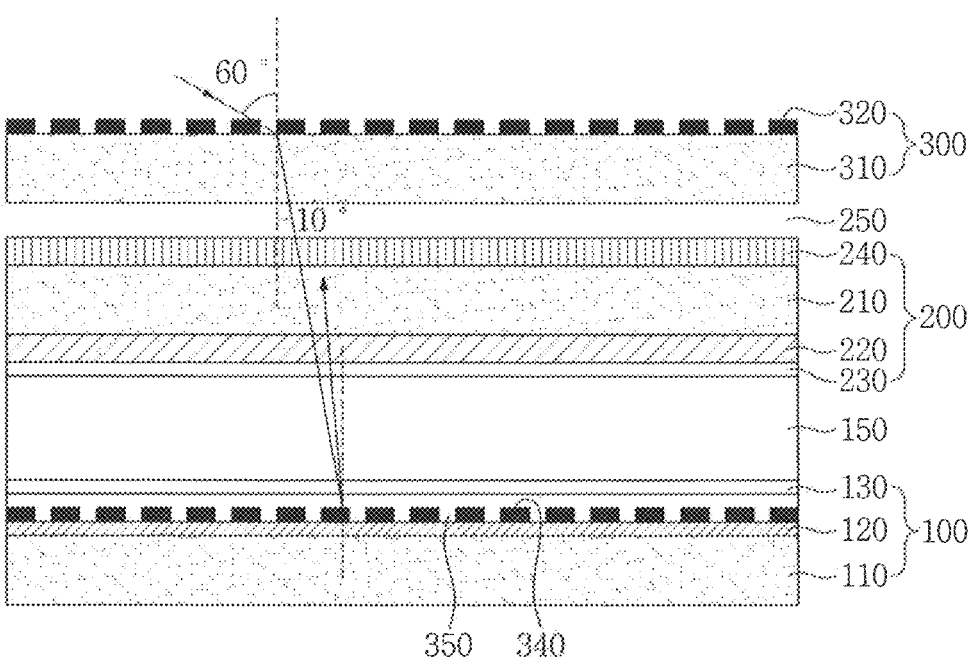

FIG. 4 is a cross-sectional view illustrating a display device according to an embodiment of the inventive concept.

Referring to FIG. 4, the display device according to an embodiment of the inventive concept includes a metasurface pattern 340 (hereinafter, "a second metasurface pattern") disposed on the reflective layer 120. Although FIG. 4 shows the metasurface pattern 320 (hereinafter, "a first metasurface pattern") disposed on the third substrate 310, exemplary embodiments are not limited thereto. For example, the second metasurface pattern 340 according to the present embodiment may be formed along with the metasurface pattern 320 which is disposed on one surface of the third substrate 310 as in an embodiment illustrated in FIG. 2 or 3, or may be formed absent the metasurface pattern 320. The detailed descriptions of the components described hereinabove with reference to FIGS. 2 and 3 will be omitted.

Figure 5:
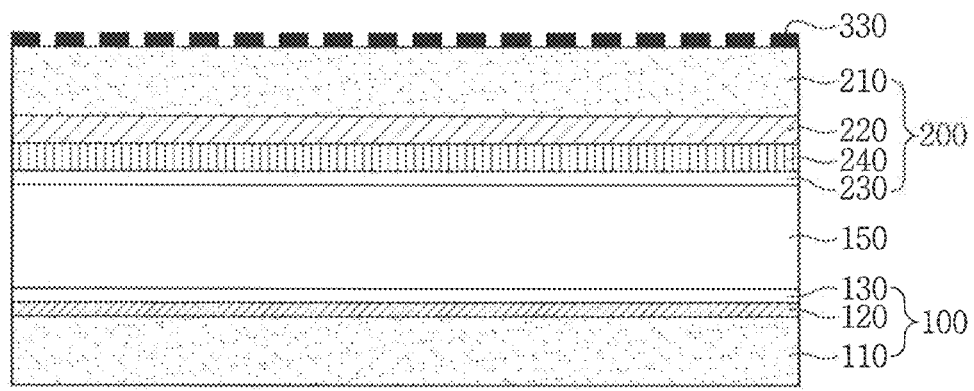

As shown in FIG. 5, the second metasurface pattern 340 is disposed on the reflective layer 120. A planarizing layer 350 may be disposed on the second metasurface pattern 340 and an exposed portion of the reflective layer 120. The planarizing layer 350 allows the pixel electrode 130 to be stably disposed thereon and to be insulated from the second metasurface pattern 340.

In an embodiment of the inventive concept, a dielectric layer, e.g., the third substrate 310, may be disposed between the second metasurface pattern 340 and the reflective layer 120. Alternatively, the second metasurface pattern 340 and the reflective layer 120 may be formed unitarily. For example, the second metasurface pattern 340 may be formed directly on the first substrate 110 or on one surface of the aforementioned dielectric layer, without the reflective layer 120 shown in FIG. 4. In such an exemplary embodiment of the inventive concept, the second metasurface pattern 340 may be formed to induce the above-described anomalous reflection, without, for example, the aforementioned metal reflective layer 120.

Referring to FIG. 4, the second metasurface pattern 340 (and the reflective layer 120) is formed to achieve the above-described anomalous reflection, e.g., the incidence angle differs from the reflection angle. In an embodiment, the second metasurface pattern 340 is formed such that the reflection angle is less than the incidence angle with respect to a normal line of the second metasurface pattern 340. Accordingly, the reflected light passes through the color filter 220 more perpendicularly than the light incident to the color filter 220.

In addition, as illustrated in FIG. 4, in an embodiment of the inventive concept, the second metasurface pattern 340 may be formed such that an incidence direction and a reflection direction of light are substantially the same as each other with respect to the normal line of the second metasurface pattern 340 due to the anomalous reflection. For example, a reflection path of a light is between an incidence path of the light and the normal line. In addition, in an embodiment, an incidence path and a reflection path of light may be substantially the same as each other. Accordingly, a distance between two points of the color filter 220 on a path through which light passes is further reduced.

FIG. 5 is a cross-sectional view illustrating a display device according to an embodiment of the inventive concept.

As shown in FIG. 5, the components of the upper panel 200, e.g., the polarizing layer 240, are disposed on the inner surface of the second substrate, e.g., between the first substrate 110 and the second substrate 210, and a metasurface pattern 330 is disposed on the outer surface of the second substrate 210. According to the present embodiment of the inventive concept, a smaller number of substrates may be used as compared to the embodiments described hereinabove with reference to FIGS. 2 to 4.

Referring to FIG. 5, the common electrode 230 is disposed on the liquid crystal layer 150, the polarizing layer 240 is disposed on the common electrode 230, and the color filter 220 is disposed on the polarizing layer 240. A planarizing layer, may be disposed between the polarizing layer 240 and the color filter 220. However, the order in which the common electrode 230, the polarizing layer 240, and the color filter 220 are disposed is not limited thereto, and they may be disposed in various orders.

In an embodiment of the inventive concept, although not illustrated in FIG. 5, the second metasurface pattern 340 may be further disposed on the reflective layer 120, as shown in FIG. 4.

As set forth hereinabove, in the display device according to one or more exemplary embodiments of the inventive concept, the color reproduction rate or the contrast ratio may be increased by making a path of the light passing through the color filter more perpendicular.

While the inventive concept has been illustrated and described with reference to the exemplary embodiments thereof, it will be apparent to those of ordinary skill in the art that various changes in form and detail may be formed thereto without departing from the spirit and scope of the inventive concept.

What is claimed is:

1. A display device comprising:
a first substrate;
a second substrate disposed on the first substrate;
a liquid crystal layer disposed between the first substrate and the second substrate;
a reflective layer disposed on the first substrate, wherein the reflective layer is disposed between the liquid crystal layer and the first substrate;
a polarizing layer disposed on one surface of the second substrate; and
a metasurface pattern layer disposed on the second substrate, the metasurface pattern layer comprising a plurality of first metasurface patterns and a third substrate,
wherein the polarizing layer is disposed between the liquid crystal layer and the metasurface pattern layer,
wherein the plurality of first metasurface patterns are directly disposed on a flat surface of the third substrate, and
wherein the plurality of first metasurface patterns are spaced apart from each other so that a portion of the flat surface of the third substrate is exposed between two adjacent first metasurface patterns of the plurality of first metasurface patterns.

2. The display device of claim 1, further comprising a color filter disposed on one of the first substrate and the second substrate.

3. The display device of claim 1,
wherein the polarizing layer is disposed between the second substrate and the metasurface pattern layer.

4. The display device of claim 3, further comprising an air layer or a transparent adhesive layer disposed between the polarizing layer and the metasurface pattern layer.

5. The display device of claim 1,
wherein the plurality of first metasurface patterns are disposed on one surface of the third substrate facing the second substrate.

6. The display device of claim 1,
wherein the plurality of first metasurface patterns are disposed on one surface of the third substrate opposite to a surface of the third substrate facing the second substrate.

7. The display device of claim 1,
wherein the plurality of first metasurface patterns are a plurality of sub-wavelength antenna elements, respectively.

8. The display device of claim 7,
wherein each of the plurality of sub-wavelength antenna elements has a size less than a wavelength of visible light.

9. The display device of claim 7,
wherein each of the plurality of sub-wavelength antenna elements has a size ranging from about 20 nm to about 40 nm.

10. The display device of claim 9,
wherein the plurality of sub-wavelength antenna elements are spaced apart from each other by a distance ranging from about 3 nm to about 5 nm.

11. The display device of claim 7,
wherein each of the plurality of sub-wavelength antenna elements comprises at least one of a V-like shape, a rod shape, a polygonal plate shape, a ring shape, and a sphere shape.

12. The display device of claim 1,
wherein the metasurface pattern layer has a refractive index of about 5 or higher.

13. The display device of claim 1, further comprising:
a plurality of second metasurface patterns arranged between the reflective layer and the liquid crystal layer.

14. The display device of claim 13,
wherein the plurality of second metasurface patterns are substantially the same as the plurality of first metasurface patterns.

15. The display device of claim 13,
wherein the plurality of second metasurface patterns are different from the plurality of first metasurface patterns.

16. The display device of claim 1,
wherein the reflective layer comprises a second metasurface pattern.

17. The display device of claim 1, further comprising:
a light source on one side of the third substrate.

18. A display device comprising:
a first substrate;
a second substrate disposed on the first substrate;
a liquid crystal layer interposed between the first substrate and the second substrate;
a reflective layer disposed on the first substrate, wherein the reflective layer is disposed between the liquid crystal layer and the first substrate;
a plurality of first metasurface patterns directly disposed on an upper surface of the second substrate, wherein the plurality of first metasurface patterns are spaced apart from each other so that a portion of upper surface of the second substrate is exposed between two adjacent first metasurface patterns of the plurality of first metasurface patterns;

a color filter directly disposed on a bottom surface of the second substrate;

a polarizing layer disposed on the bottom surface of the second substrate, wherein the color filter is disposed between the polarizing layer and the second substrate; and a light source configured to provide a light to the plurality of first metasurface patterns, wherein the plurality of first metasurface patterns are disposed between the light source and the polarizing layer, and wherein the polarizing layer is disposed between the plurality of first metasurface patterns and the liquid crystal layer.

19. The display device of claim 18,
wherein the plurality of first metasurface patterns are a plurality of sub-wavelength antenna elements, respectively.

20. The display device of claim 19,
wherein each of the plurality of sub-wavelength antenna elements has a size ranging from about 20 nm to about 40 nm.

21. The display device of claim 20,
wherein the plurality of sub-wavelength antenna elements are spaced apart from each other by a distance ranging from about 3 nm to about 5 nm.

22. The display device of claim 19,
wherein each of the plurality of sub-wavelength antenna elements has at least one of a V-like shape, a rod shape, a polygonal plate shape, a ring shape, and a sphere shape.

23. The display device of claim 18, further comprising a second metasurface pattern arranged between the reflective layer and the liquid crystal layer.

24. A display device comprising:
a first substrate;
a second substrate disposed on the first substrate;
a liquid crystal layer disposed between the first substrate and the second substrate;
a reflective layer disposed on the first substrate, wherein the reflective layer is disposed between the liquid crystal layer and the first substrate;
a polarizing layer disposed on one surface of the second substrate;
a metasurface pattern layer disposed on the second substrate; and
an external light source configured to provide a light to the metasurface pattern layer,
wherein the metasurface pattern layer comprises:
a third substrates; and
a plurality of first metasurface patterns disposed on the third substrate,
wherein the plurality of first metasurface patterns are directly disposed on a flat surface of the third substrate,
wherein the plurality of first metasurface patterns are spaced apart from each other so that a portion of the flat surface of the third substrate is exposed between two adjacent first metasurface patterns of the plurality of first metasurface patterns,
wherein the metasurface pattern layer is disposed between the external light source and the polarizing layer,
wherein each of the plurality of first metasurface patterns is configured to negatively refract the light from the external source obliquely incident on a display surface of the display device to be incident substantially perpendicular to a surface of the reflective layer, and
wherein the polarizing layer is disposed between the liquid crystal layer and the metasurface pattern layer.

25. The display device of claim 24, further comprising:
a color filter disposed on one of the first substrate and the second substrate;
wherein each of the plurality of first metasurface patterns negatively refracts the light obliquely incident on the display surface with respect to a normal line to the metasurface pattern layer to within about 10 degrees with respect to the normal line to pass through the color filter substantially perpendicularly.

26. The display device of claim 1, further comprising:
a light source configured to provide a light to the metasurface pattern layer,
wherein the metasurface pattern layer is disposed between the light source and the polarizing layer.

* * * * *